United States Patent [19]
Allen

[11] Patent Number: 5,368,343
[45] Date of Patent: Nov. 29, 1994

[54] PULL RINGS FOR THE OPERATING LEVERS OF QUICK CONNECT/DISCONNECT COUPLINGS

[75] Inventor: Daniel M. Allen, Middletown, Ohio
[73] Assignee: Dover Corporation, New York, N.Y.
[21] Appl. No.: 36,716
[22] Filed: Mar. 25, 1993
[51] Int. Cl.⁵ ............................................. F16L 37/00
[52] U.S. Cl. ...................................... 285/312; 16/127; 285/311
[58] Field of Search .................. 285/38, 311, 312; 16/124, 125, 126, 127; 70/456 R; 24/270, 273

[56] References Cited

U.S. PATENT DOCUMENTS

| | | | |
|---|---|---|---|
| 455,202 | 6/1891 | Hampton | 285/312 |
| 762,339 | 6/1904 | McGibbeny | 285/312 |
| 1,700,613 | 1/1929 | Meigs | 16/127 |
| 2,177,554 | 10/1939 | Stiff | 16/127 |
| 2,757,944 | 8/1956 | Krapp | 285/312 |
| 3,439,942 | 4/1969 | Moore et al. | 285/312 |
| 3,633,948 | 1/1972 | Dickey | 285/312 |
| 4,222,593 | 9/1980 | Lauffenburger | 285/312 |
| 4,295,670 | 10/1981 | Goodall et al. | 285/312 |
| 4,392,513 | 7/1983 | Parrish | 285/311 |
| 4,938,511 | 7/1990 | Kerstine | 285/312 |

FOREIGN PATENT DOCUMENTS 2919805 11/1979 Germany ............................. 285/312

Primary Examiner—Eric K. Nicholson
Attorney, Agent, or Firm—Kinney & Schenk

[57] ABSTRACT

A quick connect/disconnect coupling comprises locking levers. Pull rings facilitate pivoting of the locking levels to a release position. The pull rings are resiliently mounted on the levers in positions that prevent the pulls rings from interfering with movement of the locking levers to their locking positions.

10 Claims, 7 Drawing Sheets

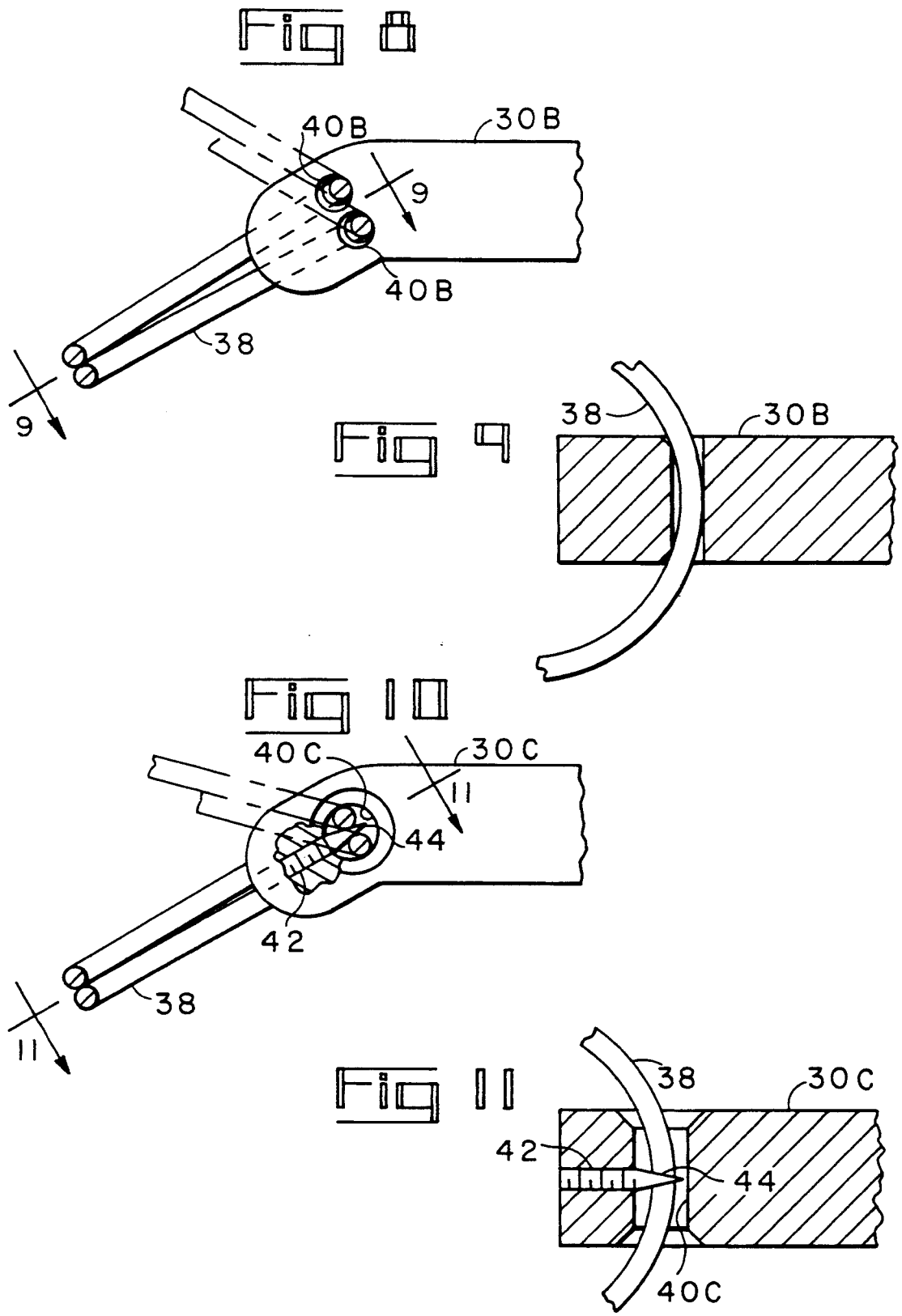

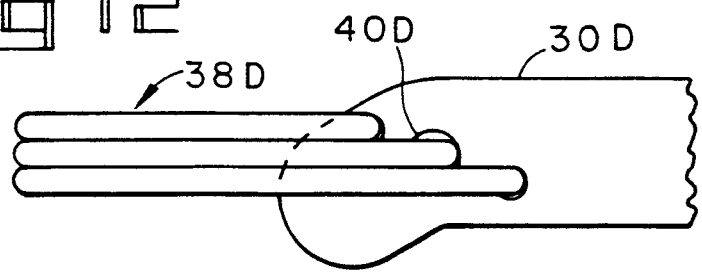
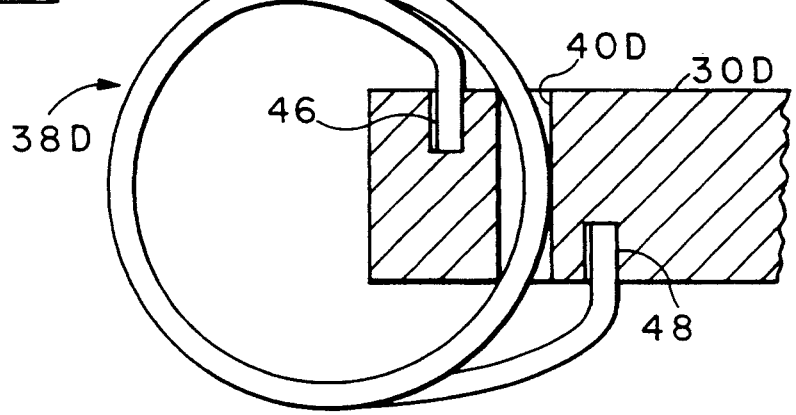
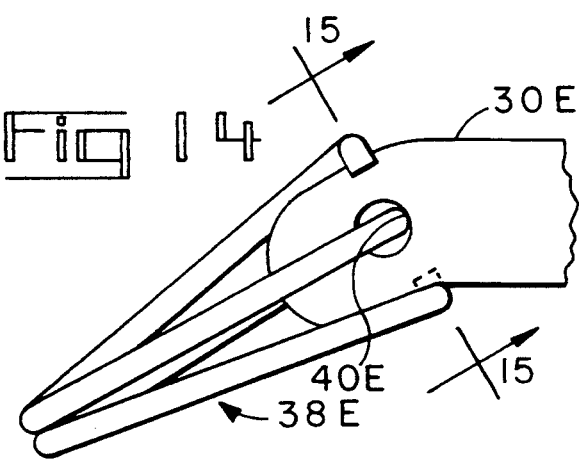
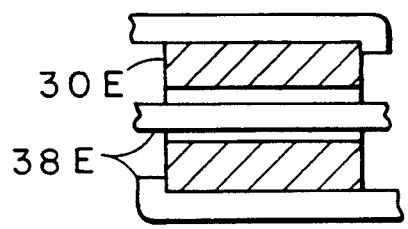
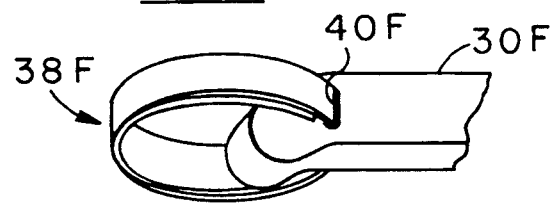

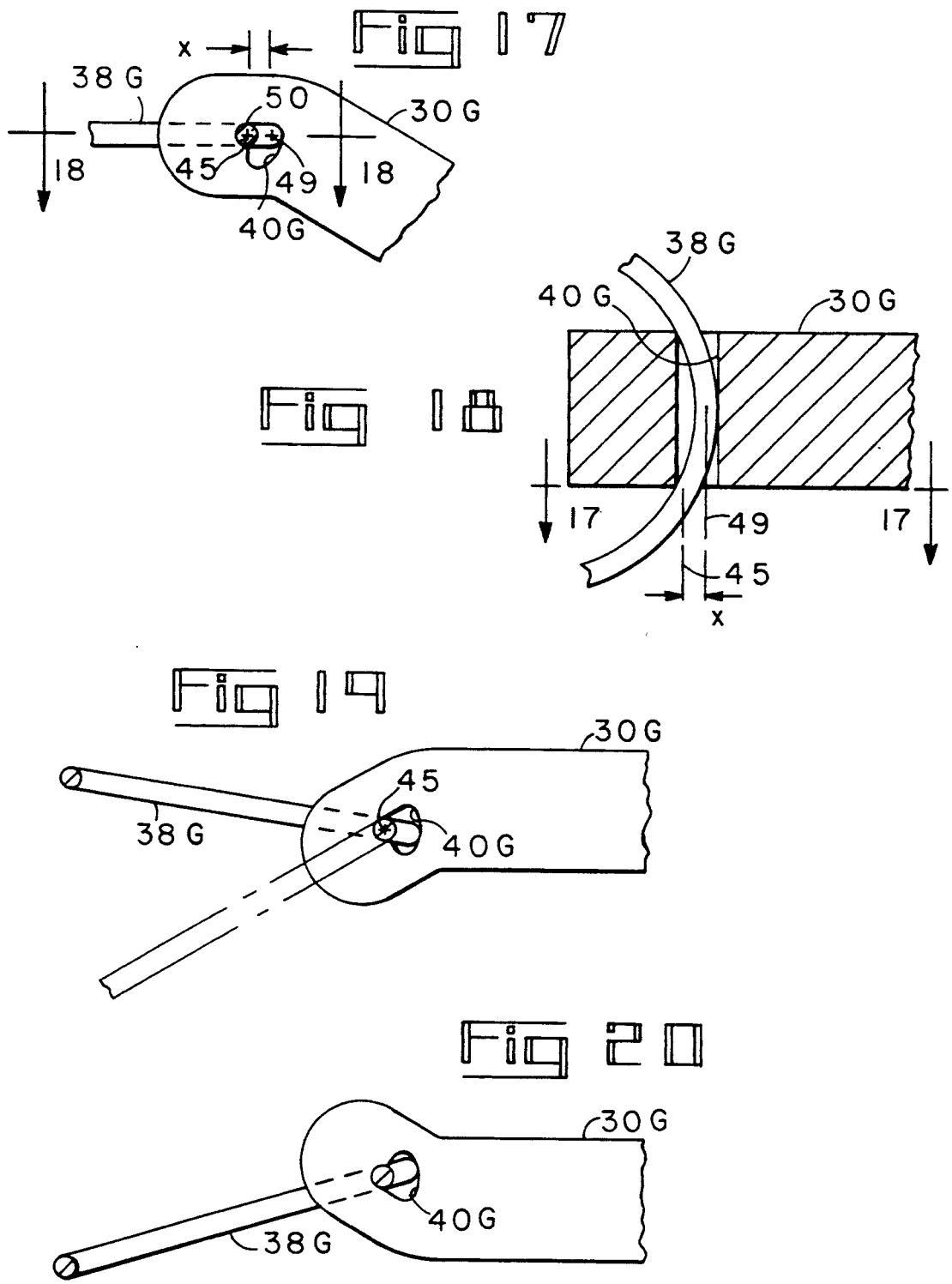

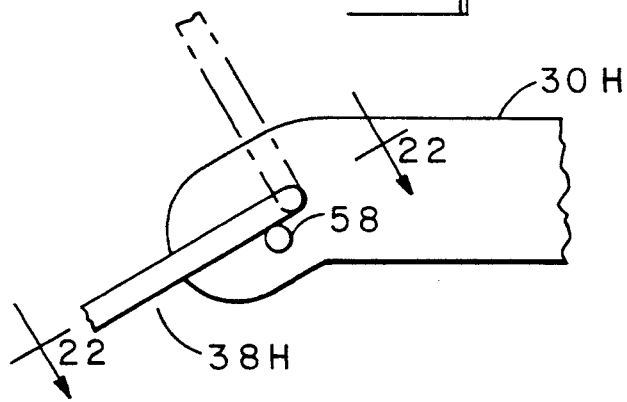
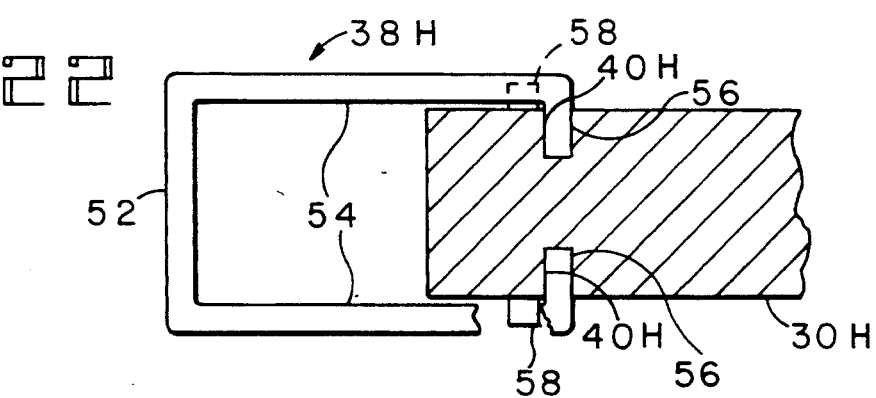
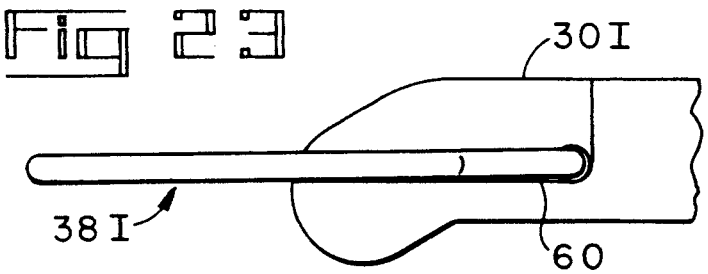
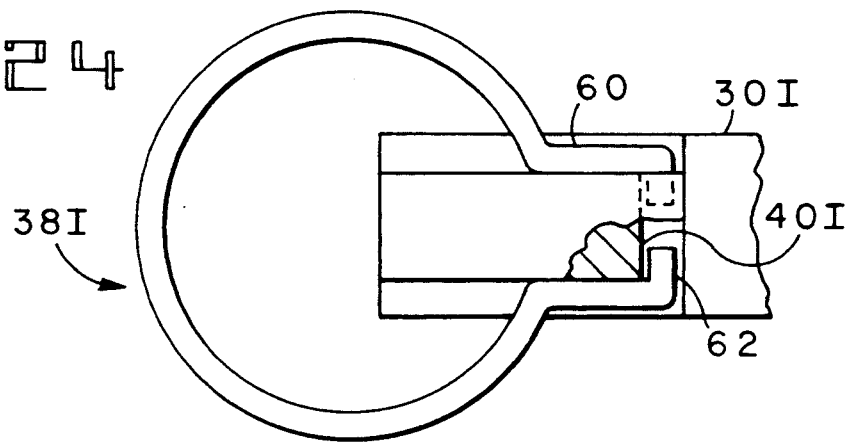

PULL RINGS FOR THE OPERATING LEVERS OF QUICK CONNECT/DISCONNECT COUPLINGS

The present invention related to improvements in a class of couplings commonly referenced as quick connect/disconnect couplings and characterized by a pair of operating levers and more particularly to improvements in the provision of pull rings that are employed to facilitate operation of these levers.

The type of coupling which motivated the present invention comprises first and second members, which are components of fluid conduits. One of the members has a circumferential groove and the other member comprises a pair of levers mounted, respectively, on opposite sides thereof. When the members are telescoped to an assembled position, the levers are disposed in positions projecting generally outwardly of the second member. After the members are telescoped, the levers are swung into general alignment with the members, thereby engaging cam means with the groove of the first member to lock the members in sealed, assembled relation.

Disconnecting the members simply involves swinging the levers outwardly and then separating the members. However, because the levers lay flat against one or the other of the coupling members, it is difficult, or awkward, to get a grip on the levers to swing them to their release positions. To facilitate release movement of the levers, it has become an accepted practice to provide rings at the outer ends of the levers. The rings are free mounted in holes which enables them to be readily engaged by a persons finger. The operator of the coupling can then insert one or more fingers in the ring. By pulling on the ring, the lever can then be swung to its release position, with a minimum of physical effort.

This simple and effective means for releasing this type of locking lever has a shortcoming in that, the ring can interfere with closing movement of the lever, when the lever is disposed in a generally upward position. Further, when the lever is disposed in a generally downward direction, the ring can be a hazard and even cause the lever to be swung to a release position. This is to say that with the ring dangling from the lever, it is possible, for example, for a projection from a passing vehicle to snag the ring and thus swing the lever to a release position.

The problem of interference with closing movement of the lever is particularly annoying, in that it often requires the use of both hands to enable disengagement of the upper lever, to the end that disconnecting of the coupling is decidedly less than the "quick" appellation which it bears. Actually this interference can be more serious than an annoyance, in that an operator may fail to completely swing an operating lever to a fully closed position. This can be the result of the operator's inadvertence, or it may result from an operator's lack of diligence, in the face of realizing that a lever has not fully swung to a locking position. In either event, the security of the connection made by the coupling is compromised and the possibility of a separation of the coupling exists.

Accordingly the primary object of the present invention is to overcome the noted problems with respect to pull rings that facilitate swinging of coupling levers to a release position.

It will further be noted that the coupling field is highly competitive. This is to emphasize that cost is a primary determining factor as to the commercial acceptance of a product in this field. Thus, any change in the pull ring system described must, of necessity, involve no more than a minimal increase in the cost of the couplings. In other words, the customers for such couplings regard the referenced problems with the present pull rings to be in the nature of an annoyance. Such customers would resist paying a premium for a coupling which would eliminate the problems, but would buy a coupling in which the problems were overcome in preference to a coupling having the problems, all other factors being essentially equal.

Accordingly a further and particularly significant object of the present invention is to attain the foregoing ends with little or no added expense in the manufacture of couplings in which these operating levers are incorporated.

The foregoing ends are broadly attained by provided means for limiting pivotal movement of pull rings (more broadly characterized as bails) so that they cannot be disposed in a position in which they would interfere with or otherwise resist movement of locking levers to a locked position.

In accordance with another and preferred object of the invention, in addition to so limiting pivotal movement of the pull rings, or bails, means are also provided for resiliently maintaining the pull rings in a fixed relation generally longitudinal of the locking lever.

The above and other related objects and features of the invention will be apparent from a reading of the following description of preferred embodiments, with reference to the accompanying drawings and the novelty thereof pointed out in the appended claims.

IN THE DRAWINGS

FIG. 8 is a fragmentary view similar to FIG. 7 illustrating a further alternate pull ring/operating lever connection;

FIG. 9 is a section taken on line 9—9 in FIG. 8;

FIG. 10 is a fragmentary view similar to FIG. 7 illustrating yet another alternate pull ring/operating lever connection;

FIG. 11 is a section taken on line 11—11 in FIG. 10;

FIG. 12 is a fragmentary view similar to FIG. 7, illustrating another alternate pull ring/operating lever connection:

FIG. 13 is a plan view of the connection seen in FIG. 12;

FIG. 14 is a fragmentary view similar to FIG. 7, illustrating another alternate pull ring/operating lever connection;

FIG. 15 is a section taken on line 15—15 in FIG. 14;

FIG. 16 is a perspective view of yet another embodiment if the invention;

FIG. 17 is a fragmentary view similar to FIG. 5 illustrating an alternate pull ring/operating lever connection;

FIG. 18 is a section taken on line 18—18 in FIG. 17;

FIG. 19 illustrates the operating lever of FIG. 17 in its locked position;

FIG. 20 is a fragmentary view, on an enlarged scale, illustrating the pull ring connection of FIG. 17 as it would function on the lower operating lever;

FIG. 21 is a fragmentary view similar to FIG. 7 illustrating still another alternate pull ring/operating lever connection;

FIG. 22 is a section taken on line 22—22 in FIG. 21;

FIG. 23 is a fragmentary view similar to FIG. 7 illustrating still another alternate pull ring/operating lever connection: and FIG. 24 is a plan view of the pull ring/operating lever connection seen in FIG. 23.

Figure 1:
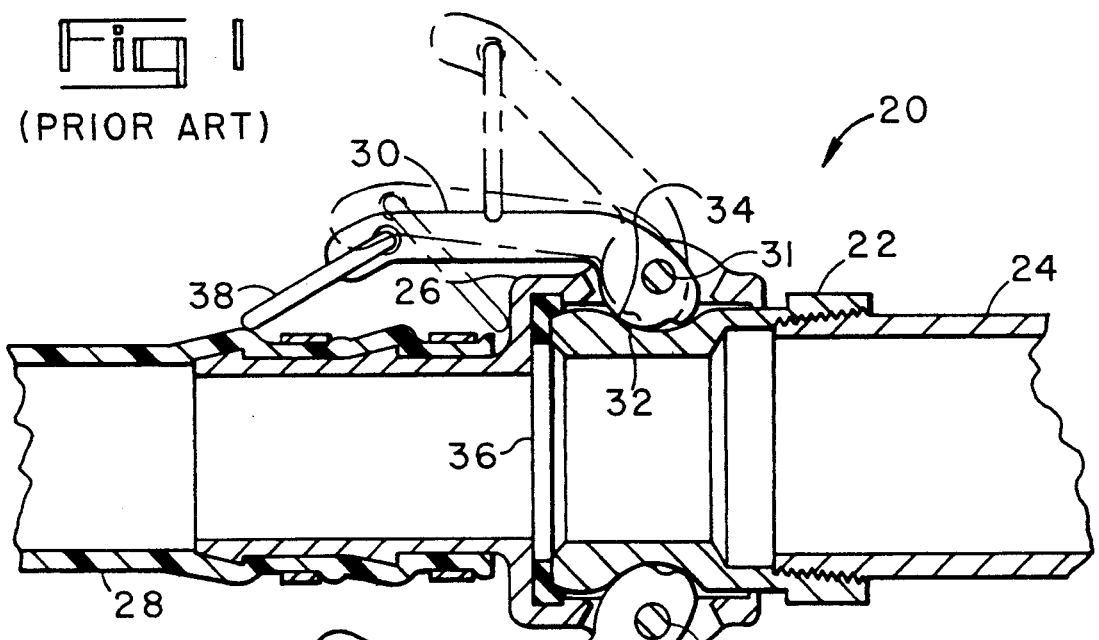
FIG. 1 is an elevation, in longitudinal section, of a quick connect/disconnect coupling illustrating the problems incident to prior art use of pull rings for releasing the operating levers thereof.

Reference is first made to FIG. 1 for a description of prior uses of pull rings to release locking levers of quick connect/disconnect couplings. The illustrated coupling, indicated generally by reference character 20, is identical with the coupling disclosed in U.S. Pat. No. 4,618,171, which is of common assignment with the present application. The teachings of Pat. No. 4,618,171 are herein incorporated by reference and the coupling itself will be briefly described to the extent required to give an understanding of the present invention.

The coupling 20 comprises a first member 22, which is attached by a threads to a fluid conduit 24 and a second member 26, which is attached to a tubular conduit 28 by clamp means. A pair of operating levers 30 are pivotally mounted on the second member 26 by pins 31. The coupling 20 is illustrated in its locked position wherein the outer ends of the levers 30 are generally aligned with the axis of the coupling 20. In this position cams 32, on the inner ends of the levers 30, are engaged with a circumferential groove 34 on the first member 22. The first and second members 22, 26, are thus locked in coupled relation, with the end of the first member 22 sealingly engaging a gasket 36, to prevent fluid leakage from this coupling.

To disconnect the first member 22 from the second member 26, the levers 30 are swung so that they face a direction generally opposite to their locked positions. When so swung, the cams 32 are clear of the groove 34 and the coupling members can be readily separated. Assembly is done in reverse fashion. The levers are swung so that they are disposed generally outwardly of the second member. The first member is then positioned in the second member at least to an extent sufficient for the cams 32 to engage the groove 34 when they are swung to the illustrated locked position.

Figure 2:
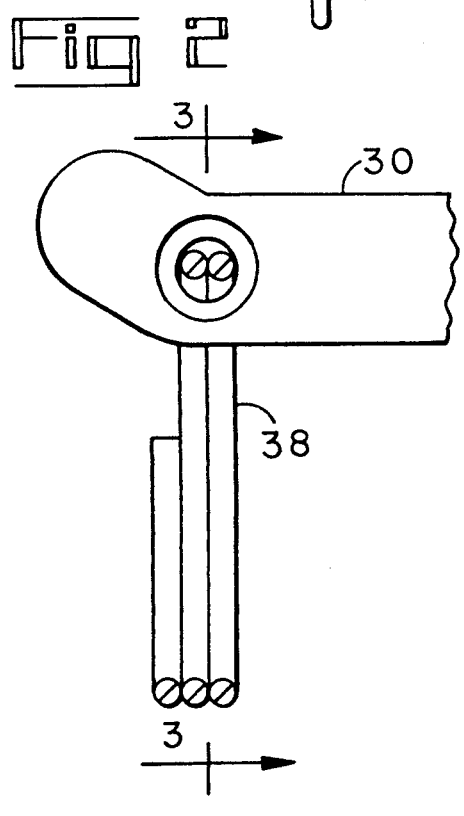
FIG. 2 is fragmentary view, on an enlarged scale, of the connection between a pull ring and one of the operating levers seen in FIG. 1.
Figure 3:
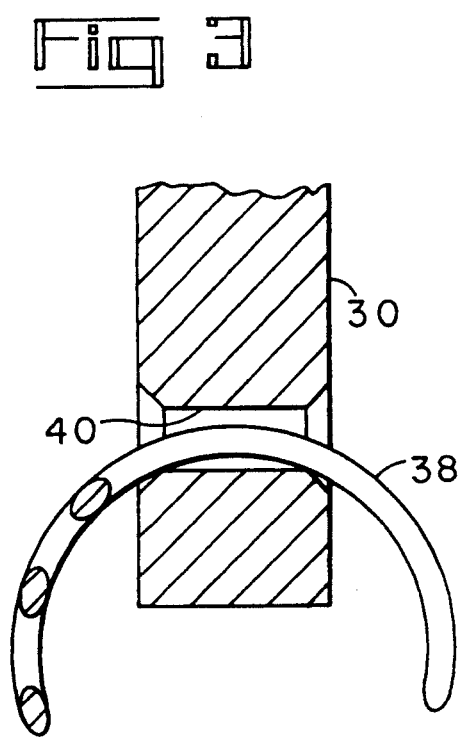
FIG. 3 is a section taken on line 3—3 in FIG. 2.

At this point it will be noted that a pull ring 38 is provided at the outer end of each of the operating levers 30. The configuration of the rings 38 is best shown in FIGS. 2 and 3. The rings 38 are in the form of a tightly coiled wire of two and a half turns. Such a ring is inexpensive to manufacture, even though it is made of a spring steel, or other appropriate resilient material. Each ring 38 is freely pivotal in a hole 40, formed in the lever 30. Assembly of the rings is simple in that one end of the wire coil can be inserted through the hole 40 and the ring then rotated to thread it into assembled relation on the holes 40.

The purpose and function of the rings 38 are to facilitate the initial displacement of the locking levers from their locking positions. This is to point out that when the levers are in their locking positions the locking pressures on the cams 32 make it difficult to initially release the levers. It is difficult for a person to get his fingers under the levers 30 to swing them outwardly. It is even more difficult to swing the levers simultaneously, which is also desirable.

The rings 38 overcome these problems. They may be readily swung to a position where one or more fingers can be inserted. The rings may be simultaneously gripped in the opposite hands of a user. Because they can pivot relative to the levers 30, the rings 38 can exert a force which is generally normal to the lever arm of the levers 30 relative to their centers of pivotal movement, as the operator's hands are pulled outwardly.

One problem with the rings 38 is that, they are free to swing, relative to the lever, remain in a generally vertical orientation, as illustrated by the broken line showing of the upper lever and the solid line showing of the lower lever, in FIG. 1. When the upper lever 30 is swung counterclockwise and downwardly from the broken line position towards the locking position, the depending ring 38 engages the upper surface or the second member 26, or the conduit connected thereto. The upper lever 30 therefore cannot be freely swung to a locking position. This is a significant inconvenience in that some definitive action is required to clear the ring from this blocking position, often requiring the use of both hands to release the upper lever so that it can be displaced to the illustrated locking position.

It will also be noted that the ring 38 for the lower lever 30 hangs downwardly in free fashion, and is positioned so that it would be possible for it to be snagged by a moving projection.

With the foregoing description of prior art pull rings in mind, the advantages of the present invention will be apparent from the following description of a preferred embodiment, found in FIGS. 4–7.

Figure 4:
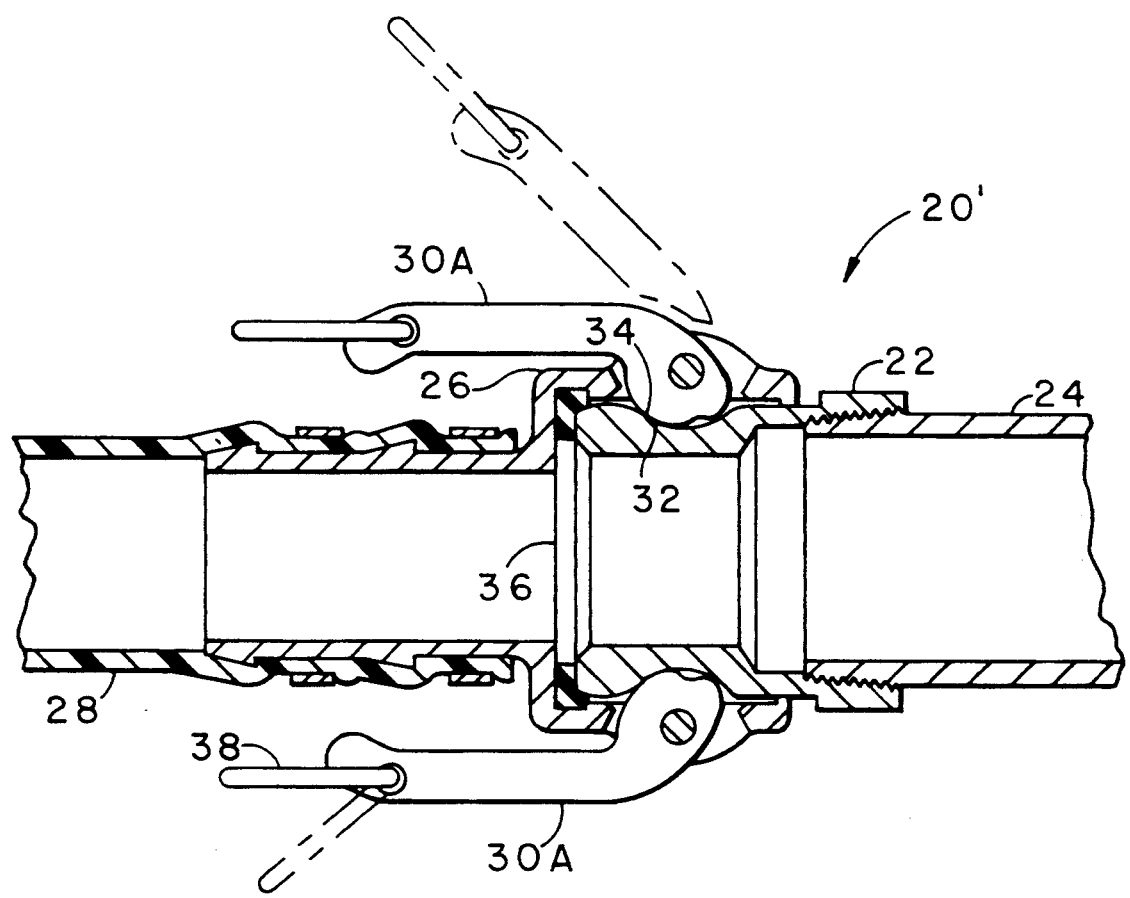
FIG. 4 is an elevation, in longitudinal section, of a quick connect/disconnect coupling illustrating the provision of pull rings for the operating levers thereof in accordance with the present invention.

The coupling 20' seen in FIG. 4 is identical with the coupling 20 (FIG. 1) excepting that the levers 30A, which have been modified to yieldingly maintain the rings 38 in general longitudinal alignment with the respective levers 30A, on which they are mounted.

Figure 5:
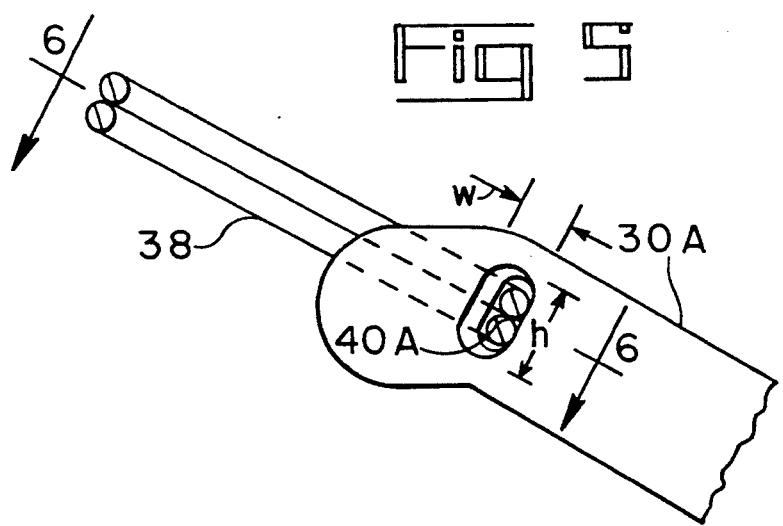
FIG. 5 is fragmentary view, on an enlarged scale, of the connection between a pull ring and the upper operating lever, seen in FIG. 4, shown in its broken line position.
Figure 6:
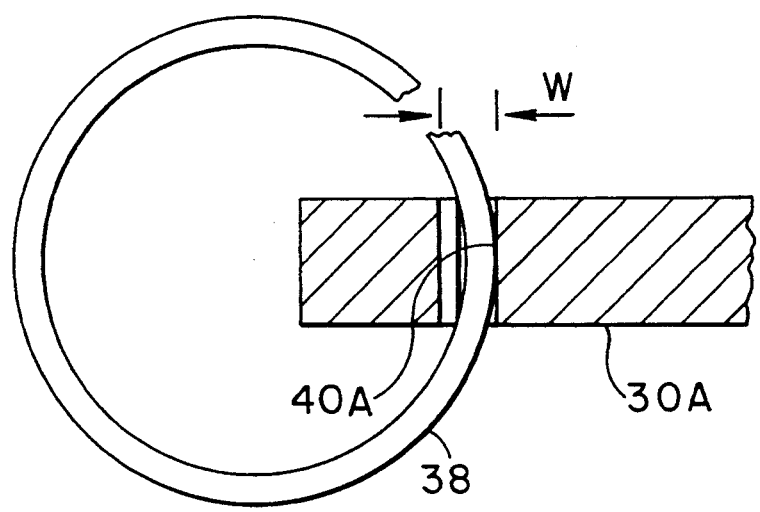
FIG. 6 is a section taken on line 6—6 in FIG. 5.
Figure 7:
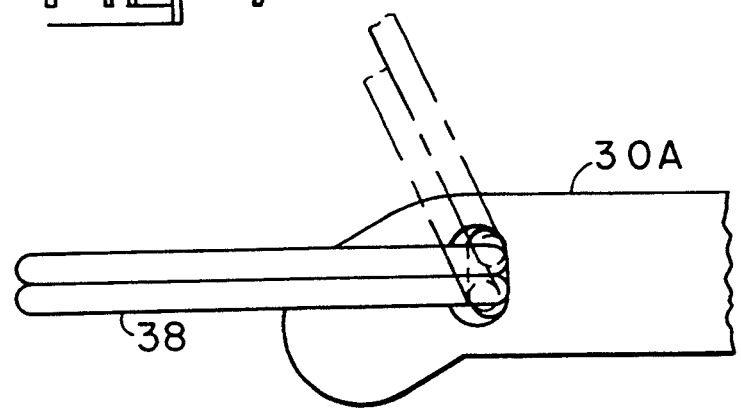
FIG. 7 illustrates the operating lever of FIG. 5 in its locked position.

The details whereby such end is attained are shown in FIGS. 5–7. In this embodiment of the invention, the rings 38 may be identical with the pull rings previously employed in the fashion described in connection with FIGS. 1-3. The ends of the invention are achieved by providing an opening 40A in each of the levers 30A which has an outline that prevents rotation of the ring 38 relative to lever 30A.

The opening 40A is illustrated as having a height h and a width w. In a very narrow lever, the width w would approximate the diameter of the wire forming the coils of the ring 38. The height h would equal the diameter of wire times the number of coils to be disposed in the hole 40A. In most cases and for most practical cases there will be two coils disposed in the opening 40A. Thus, with a very narrow lever 30A, the height h would approximate twice the width w and the width w would approximate the diameter of the wire forming the ring 38.

FIG. 6 illustrate that, as the thickness of the lever 30 increases, the width w, of the slot 40A, increase to accommodate the arcuate chord encompassed within the slot 40. This is to say that the portions of the slot 40A, which are effective to constrain rotation of the ring 38 are provided by the central portion of the slot 40A away from the end of the lever 30A and by the opposite, outside edges of the slot 40A on the side of the slot 30A nearest the distal end of the lever 30A.

Both the height and width dimensions will usually be greater than the minimums as above described, in order to facilitate assembly. Thus there will generally be some looseness between the slot 40A and the ring 38, but nonetheless, rotation of the ring 38 relative to the slot 40A will be constrained.

The end sought to be obtained in configuring the outline of opening 40A is to prevent unlimited rotation of the ring 38 in the opening 40A.

The curvature factor, just discussed, is recognized in the prior where the opposite sides of the hole 40 are countersunk to minimize the length of the hole 40, thereby minimizing the diameter of the hole 40. See FIG. 3. The same principle could be employed in connection with the hole 40A. That is, its opposite ends could be countersunk, i.e., flared outwardly, toward the end of minimizing the width dimension w.

The extended discussion of the ratio of the dimensions h to w involves the relationship which resiliently positions the ring 38 relative to the lever 30A. The end of preventing the ring 38 from interfering with movement of the lever 30A to a locking position is attained by the disposition of the slot 40A relative to the lever 30A. It is preferred that the ring 38 be positioned relative to the lever 30A so that it is spaced from the second coupling member 26 (or the conduit attached thereto), as illustrated in FIG. 4.

It will be noted that the outer end portions of the levers (30) herein referenced are angled inwardly relative to the main portions of the levers which are disposed in generally longitudinally of the coupling in their locked positions. In meeting the ends of the present invention, a pull ring (38) may generally oriented between a position in alignment with the bent, outer end portion of the lever (30) or the main portion of the lever (30), but in any event will be positioned so that the ring (38) does not interfere with movement of the lever (30) to its closing position. This is to say that it would be possible for the ring (38) to contact the coupling member (26) (or conduit) at any angle which would cam the ring (38) toward alignment with the lever (30), all without interfering with displacing the lever (30) to its locking position.

Mounting of the rings 38 on the levers 30A is the same as in the prior art practice in that one end of the coil is inserted through the opening 40A and then the ring is rotated to thread the ring into its assembled position.

To complete the description of the present embodiment, reference is made to the fact that while rotation of the portion of the ring 38, which is within the slot 40A is limited, the ring itself may be pivoted outwardly, relative to the lever 30A, for engagement by an operator's fingers to facilitate pivoting of the levers 30A to their release positions, in the same fashion described in connection with the prior art coupling.

Pivoting of the ring 38 to a position for releasing the lever 30A is illustrated in FIG. 7. When the outer end of the ring 38 is displaced outwardly, the two full coils of the ring, individually and separately pivot relative to the opening 40. The outer, free end of the ring 38 can thus be gripped by one or more fingers to exert an opening force on the lever 30A in essentially the same, if not an identical, fashion as was exerted on the lever 30 in the prior art usage of rings 38.

FIGS. 8 and 9 illustrate another embodiment of the invention which employs the same conventional pull ring 38 employed in prior art couplings as previously described. An understanding of this embodiment requires only a description of an operating lever 30B and the means for mounting a pull ring 38 at the outer end thereof.

The lever 30B is provided with two holes 40B for mounting the ring 38. The holes 40B are vertically aligned in a plane which is generally at right angles to the longitudinal direction of the lever and more specifically at right angles to the inwardly bent outer end portion of the lever 30B. The angular relationship of the ring 38 relative to the lever 30B differs from the angular relation of the ring 38 relative to the lever 30A. None the less, the outer end of the ring 38 will be positioned so that it does not interfere with movement of the lever 30A to a locking position.

The diameter of the holes 40B is at least as great as the diameter of the wire forming the coil ring 38. The width of the lever 30B and the arc or the ring 38 again have an affect on the minimum diameter of the holes 40B which will permit rotation of the ring coils relative thereto. The holes 40B may be countersunk, or relieved as at 41, to permit the use of smaller holes 40B. Actually, a full countersink is not required, only a relief of the holes toward the distal end of the lever 30B.

The described connection of the ring 38 to the lever 30B provides essentially the same functions and advantages as the embodiment of FIGS. 4–7. Assembly is the same as before in that one end of the wire coil of ring 38 may be inserted through one of the holes 40B, the coil rotated to enable insertion of that end of the coil through the other hole 40B. Continued rotation of the ring coil 38 completes its mounting on the lever 30B.

The portion of the pull ring 38 captured on lever 30B is thus limited as to its rotation relative thereto. In this embodiment the ring is resiliently maintained in its longitudinally projecting relation, notwithstanding that there will be some degree of clearance between the holes 40B and the wires forming the ring 38. This is to point out that the ring is formed by a wire coil wherein the coil is tightly wound so that there is little or no space between adjacent coils. When the ring is mounted on the lever 30B, the adjacent coils in the holes 40B have been spread in a lateral direction. Displacement of the adjacent coils in this fashion results in a resilient force which tends to maintain the ring 38 in a position at right angles to the plane of the axes for the holes 40B.

In any event, the ring 38 is positioned in a direction sufficiently aligned with the longitudinal direction of the lever 30B so that the lever 30B can be freely swung to its locking position.

It will also be appreciated that the outer end of the ring 38 is pivotal in an outward direction when engaged by an operator's fingers and a pull exerted thereon to release the lever 30B from its locking position. It is, of course, to be appreciated that a description of one lever 30B is applicable to the other lever 30B and that the only difference in operation will be whether the lever is disposed toward the top or toward the bottom of the coupler. Actually, with the resilient mounting of the lever, as provided by this embodiment, there is no essential difference in the operation of the levers 30B in any angular orientation of the coupler.

FIGS. 10 and 11 illustrate a further embodiment of the invention which employs the conventional pull ring formed by a wire coil having two and a half turns.

In this embodiment a lever 30C is provided with a hole 40C which may be countersunk at its opposite ends in essentially the same fashion as the mounting hole 40 in the prior art lever 30. In this embodiment, the ring 38 is threaded into assembled relation in the hole 40C, as above described. A screw 42 is then threaded inwardly from the distal end of the lever 30C to project a conical end 44 thereof between the coils of the ring 38. Alternatively, the screw 38 or some other partition means can be put in place and then the ring threaded into assembled relation in the fashion described in connection with the embodiment employing two mounting holes 40B.

This embodiment is also similar to that of FIGS. 8 and 9, in that the tightly wound coils of the ring 38 are spread apart so that they resiliently maintain the ring 38 in a longitudinally projecting position relative to the lever 30C. Likewise the outer end of the ring 38 can rotate relative to the distal end of the lever 30C when engaged by an operator's fingers to provide an effective releasing force on the lever 30C.

FIGS. 12 and 13 illustrate a modified ring 38D, mounted on lever 30D. The ring 38D comprises essentially two full wire coils, with one free end 46 spaced inwardly of the full coil and the other free end 48 spaced outwardly of the full coil. One free end of the ring 38D may be inserted through an opening 40D and the ring threaded into assembled relation. The ring ends are then inserted into blind openings disposed, respectively, inwardly and outwardly of the opening 40D, in a longitudinal sense relative to the lever 30D.

It will be readily apparent that the ring 38D functions in essentially the same fashion as the previous embodiments of the invention in that it is yieldingly positioned in longitudinally projecting relation from the lever 30D. The outer end of the ring 38D is likewise free to pivot relative to the lever 30D in exerting a force normal to the lever 30D in releasing the lever from a locking position.

FIGS. 14 and 15 illustrate another embodiment of the invention which employs a wound wire coil, pull ring 38E mounted on a lever 30E. In this embodiment, the ring 38E comprises slightly more than two full coils. One end of this coil is inserted through an opening 40E in the lever 30E and threaded into assembled relation. One end of the coil is then disposed to lie on the upper surface of the lever 30E and the other end is disposed to engage the lower surface. The coils are thus deflected from there tightly wound relation and yieldingly position the ring 38E to project in longitudinal relation from the lever 30E. After assembly, free ends of the coil may be bent into abutting relation with the sides of the lever 30E to prevent rotation of the ring 38E so the ring will not inadvertently be disengaged from the lever 30E.

The outer end of the pull ring 38E is likewise free to swing relative to the lever 30E to exert a force normal thereto in displacing the lever 30E to a release position.

FIG. 16 illustrates a pull ring 38F mounted on a lever 30F. In this embodiment, the ring 38F is a coil of strip material which is wound on itself, as opposed to being wound in helical form as the previously described pull rings have been. The strip material forming the ring 38F has a rectangular cross section which is received in an opening 40F in the lever 30F. The strip coil which has been wound on itself may also be mounted on the lever 30F by inserting the outer free end of the strip through the opening 40F and then threading the ring 38F into assembled relation.

The slot 40F positions the ring 38F in projecting relation longitudinally and outwardly of the lever 30F. The ring 38F has enough flexibility for the outer end to be resiliently displaced outwardly so that a force can be exerted normal to the lever 30F in displacing it to a release position.

Reference is next made to FIGS. 17–20 for a description of yet another embodiment of the invention. In this embodiment a pull ring 38G comprises a substantially rigid hoop. The ring 38G is mounted in an opening 40G formed in a lever 30G, which is, otherwise, identical with the operating levers previously described. The ring 38G may be initially split for insertion through the opening 40D. After being so inserted, the ends of the ring may be joined, as by brazing, to form a structural hoop.

This embodiment takes advantage of the chordal affect of the width of the lever 30G relative to the arc of the portion of ring 38G within the opening 40G.

Looking at FIGS. 17 and 18, it will be seen that the slot 40G is defined, in part by radii swung about longitudinally spaced centers 45, 49. Center 45 is the center of the ring 38G at the opposite sides of the opening 40G. Center 49 is the center of the ring 38G centrally of the transverse length of the opening 40G, through the lever 30G.

When the lever 30G (which corresponds to the upper lever of FIGS. 1 and 4) is in the position illustrated in FIG. 17, it is positioned to be swung downwardly to its fully locked position. In this position, the portion of the opening defined by an radius swung about center 45 supports and provides a fulcrum point for the ring 38G, at 50. The weight of the major portion of the ring 38G exerts a downward force tending to rotate the ring about fulcrum 50. Such force is resisted by engagement of the central portion of the ring (within opening 40G) with the portion of the opening defined by the radius swung about center The ring 38G is thus positioned so that it cannot interfere with closing movement of the lever 30G.

The outer end of the ring is also pivotal relative to the lever 30G so that a manual force can be applied through the ring 38G to facilitate opening movement of the lever 30G; reference FIG. 19. It will be seen that the lower portion of the opening 40G is defined by a radius swung from the center 45. This provides clearance for the portion of the ring 38G, which is within the opening 40G, to be swung in a clockwise direction, about center 45. The ring 38G may thus be positioned to exert a force generally normal to the lever 30G in swinging the lever 30G to a release position. The material for ring 38G may have sufficient flexibility so that the portion engaged by a user's fingers swings freely relative to the opening 40G and then the ring itself deflects as the outer end is brought to a position normal to the lever 30G. It is also appreciated that the ring 38G could be formed of a high performance synthetic resin as opposed to using metal such as a steel or spring steel wire.

One further point to note is that mounting the ring 38G in the fashion described does permit it to be angled outwardly of the coupling when the lever 30G is in a lower position, as illustrated in FIG. 20. Outward projection of the ring 38G is somewhat limited and, in any event, is acceptable in many coupling applications.

The embodiment of FIGS. 17–22 (and the following embodiment next to be described) differ from the first described embodiments of the invention in that means are provided for preventing pull ring from interfering with movement of the lever to a locking position, but, in attaining this end, the ring is not resiliently maintained in a relatively fixed, position with respect to the lever.

The next embodiment of the invention is illustrated in FIGS. 21 and 22, in the same generally fashion as previous alternate embodiments, by illustrating the mounting of a pull ring on one operating lever which is shown as the upper locking lever. In FIG. 21, an operating lever 30H is shown in a position in which conventionally mounted finger rings tend to interfere with closing movement of the operating lever.

In this embodiment the ring 38H is not truly a ring, in the sense that it is not circular in outline. Further, it is not a complete loop, or endless configuration. Thus ring 38H is better characterized as a bail and will be so identified in the following description. It will also be appreciated, however, that its function is the same as the previously described rings 38 in providing a means for exerting a force on an operating lever which is normal to the operating lever. The rings 38, 38D, 38E, 38F, and 38G thus come within the more generic term "bail".

The bail 38H thus comprises an outer grip portion 52, rearwardly extending legs 54 and inwardly bent projections 56. the projections 56 are pivotally received in aligned openings 40H formed in the lever 30H. The bail 38H is formed of a resilient material so that the legs 54 may simply be spread a distance sufficient for the projections 56 to engage the openings 40H.

FIG. 21 illustrates the locking lever 30H in a relative position in which conventionally mounted pull rings tend to interfere with closing movement of an operating lever.

It will be seen that, in this embodiment, pivotal movement of the bail 38H in a clockwise direction is limited by lugs 58 (one could be sufficient). The lugs 58 are integral projections from the body of the lever 30H and underlie the bail legs 54. The legs 54 thus rest on the lugs 58 and prevent the bail 38H from interfering with closing movement of the lever 30H.

The bail 38H, is free to be engaged by a user's finger and swung to a position in which it may be gripped and exert a force normal to the lever 30E in releasing the lever 30E from its locked position.

FIGS. 23 and 24 illustrate a further embodiment, which functions in essentially the same fashion as the previous embodiment. This embodiment comprises a bail 38I, the gripped portion of which is of circular outline, with legs 60 extending rearwardly. Inwardly bent projections 62, from the legs 60, are pivotally received in an opening 40I. As in the previous embodiment the legs 60 are simply spread to permit insertion of the projections 62 into the opening 40I.

In this embodiment the upper portion of the distal end of the lever 30I is inset to define ledges 64, which underlie the legs 60 and prevent the bail 38I from falling to a position in which it would interfere with movement of the lever 30I to a fully closed position.

One final point to note is that the operating levers, because of the high forces involved in locking the coupling members, are formed of a high strength alloy and, advantageously, are formed by a sintered metal process. In the sintered metal process, it is possible to form both regular and irregular configurations with little or no cost differential. This is to point out that, with the sintered metal process, it is possible to obtain the several openings 40 with only a minimal increase in the cost of the operating levers 30. Further, there is little or no cost differential between a regularly shaped, circular opening 40C, the irregular shaped openings 40A, 40G and 40F and plural openings 40B, 40H.

The foregoing description, particularly with respect to the embodiments described in connection with FIGS. 4–16, has focused on the pull ring (bail) being disposed in a position projecting outwardly from the distal end of the locking lever. While this is preferred, it is to be appreciated that such is a "storage" position for the ring (bail). Its operative position is when it is pivoted generally laterally of the lever to exert an opening force on the lever. Thus, the ring could also be stowed in a position in which its distal end projects inwardly of the locking lever. It will be readily apparent to one skilled in the art that the pull ring embodiments herein described could be modified to so disposed the pull ring in its stowed position, while achieving the primary object of preventing the pull ring from interfering with movement of the locking lever to its locking position.

The scope of the invention is therefor to be derived from the following claims, as related to the spirit of the invention described herein.

Having thus described the invention, what is claimed as novel and desired to be secured by Letters Patent of the United States is:

1. A coupling of the type comprising
    first and second members and
    means for locking said members in assembled relation,
    wherein the locking means comprise
    a locking lever which is swingable, about a first axis, from
        an unlocked position in which the lever projects laterally of the coupling, to
        a locked position in which the locking lever is generally aligned with the coupling, with an inner surface facing the coupler,
    further comprising a bail, pivotally mounted, about a second axis, on a distal end portion of the locking lever,
    said lever providing an effective leverage arm between the first and second axes,
    said bail being engageable by an operator's fingers to exert a force on the lever generally normal to the effective leverage arm in releasing the lever from its locked position, and
    means for limiting pivotal movement of the bail, in an inward direction toward the coupling members, to a relatively low angle with respect to the effective leverage arm and thus preventing the bail from swinging to a position in which the bail would interfere with freely swinging the lever to its locking position, and
    characterized by
    the bail being freely pivotal in an outward directions, relative to the effective leverage arm, to a substantiality greater extent than it is pivotal in an inward direction so that the bail is pivotal to a position in which it approximates a right angle with respect to the effective leverage arm and facilitates releasing the lever from its locked position.

2. A coupling as in claim 1 wherein the bail comprises a pair of parallel leg potions embracing a portion of the distal end of the lever and having aligned, intent ends, which are pivotally received by the lever, and further characterized in that the means for limiting pivotal movement comprise abutment means projecting laterally from the portion of said lever, which is embraced by the parallel leg portions, in underlying relation to at least one of the bail legs.

3. A coupling of the type comprising first and second members and means for locking said members in assembled relation, wherein the locking means comprise a locking lever which is swingable from an unlocked position in which the lever projects laterally of the coupling, to a locked position in which the locking lever is generally aligned with the coupling, with an inner surface facing the coupler, and further comprising a bail, pivotaly mounted on a distal end portion of the locking lever, for engagement an operator's fingers to exert a force on the lever generally normal thereto in releasing the lever from its locked position, and means for preventing the bail from swinging toward the inner face of the lever to a position in which the bail would interfere with freely swinging the lever to its locking position, further characterize in that the means for preventing the bail from swinging to a position in which the bail would interfere with freely swinging the lever to its locking position, further comprise means for resiliently maintaining the bail in a given position relative to said lever.

4. A coupling as in claim 3 wherein the bail comprises a helically wound, wire ring comprises at least two coils, and one end of the ring is mounted on the lever, and further characterized in that means are provided for limiting pivotal movement of said one end of the ring relative to the lever.

5. A coupling as in claim 4 further characterized in that an opening extends laterally through the lever, two coils forming the ring are disposed in said opening, and the ratio of the height to width of the slot is such as to prevent rotation of the two coils relative to the slot, while permitting rotation of the individual coils relative to the slot.

6. A coupling as in claim 4 further characterized in that a pair or openings extend laterally through the lever, adjacent coils of said ring being disposed, respectively, in said openings.

7. A coupling as in claim 4 further characterized in that an opening extends laterally through the lever, one of the coils of said ring being disposed in said lateral opening, portions of the ring coils on opposite sides of said one coil engage said lever and resiliently position said ring relative to the lever.

8. A coupling as in claim 7 further characterized in that the ends of the ring coils, on opposite sides of said one coil, engage the top and bottom surfaces of said lever.

9. A coupling as in claim 7 further characterized in that the ends of the ring coils, on opposite sides of said one coil, are captured in openings in the sides of said lever.

10. A coupling as in claim 3 further characterized in that the bail comprises a resilient strip of material, having a rectangular cross section, wound on itself to form a ring, and the lever has a lateral opening of rectangular outline, in which the ring is received.

* * * * *